Patented Mar. 21, 1950

2,501,127

UNITED STATES PATENT OFFICE 2,501,127

BASIC ZINC SALICYLATE

Leonard M. Kebrich, Brooklyn, N. Y., assignor to National Lead Company, New York, N. Y., a corporation of New Jersey No Drawing. Application November 29, 1945, Serial No. 631,790

5 Claims. (Cl. 260—429)

This invention relates to basic zinc salicylate and to processes for making the same.

It is a primary object of this invention to provide a new composition of matter, basic zinc salicylate, $Zn_2C_{14}H_{10}O_7.3H_2O$. Another object of this invention is to provide a novel process for manufacturing basic zinc salicylate. A still further object of this invention is to provide basic zinc salicylate in a form suitable for use as a paint pigment for which application it has new and useful properties. A still further object of this invention is to provide paint coatings of improved durability particularly in respect to prolonged film integrity and retarded film breakdown, when exposed to the weather.

This application is a continuation-in-part of co-pending application Ser. No. 494,894, filed July 14, 1943, which has matured into Patent No. 2,406,609, granted August 27, 1946, and in which is disclosed the action of various salicylate compounds when incorporated into surface coating compositions.

Basic zinc salicylate has not prior to this invention, been commercially available. In referring to zinc salicylate compounds, those containing 1 mole of zinc oxide in combination with 1 mole of salicylic anhydride are considered normal zinc salicylate and those containing 2 moles of zinc oxide in combination with 1 mole of salicylic anhydride are considered monobasic zinc salicylate. When the proportions of zinc oxide are such that between 1 mole and 2 moles of zinc oxide are present for each mole of salicylic anhydride, the products are referred to as basic zinc salicylate compositions.

The salts of zinc and salicylic acid are considered to be a combination of divalent zinc with salicylic acid. Thus, normally zinc salicylate may be considered a combination of 1 atom of zinc (Zn) with two mols of salicylate radical ($C_6H_4OHCOO$) to form a compound represented as $Zn(C_6H_4OHCOO)_2$. This compound may also be considered from an analytical standpoint as consisting of 1 mol of zinc oxide in combination with 1 mol of salicylic anhydride as $ZnO.C_{14}H_{10}O_5$, the same proportions of the elements being present in each case. In the case of the novel basic zinc salicylate salt of this invention, two mols of zinc oxide are present in combination with 1 mol of salicylic anhydride according to chemical analysis, although it is not definitely known that the salicylate is present in the anhydride form. Therefore, the compositions of this invention will, for purpose of clarity and ease of understanding, be described as containing zinc oxide in combination with salicylic anhydride, without being specifically limited to such compounds as may contain an anhydride structure.

In its broadest aspect this invention contemplates the preparation of basic zinc salicylate compositions by a novel process comprising the reaction in aqueous media of a zinc compound, e. g., zinc oxide and a salicylate compound, e. g., salicylic acid, in such proportion that for every 2 moles of salicylic acid, there are present more than one and up to 2 moles of zinc oxide. A principal product of this invention, basic zinc salicylate in the form of fine acicular crystals has new and valuable properties as a pigment. Surface coating compositions, such as paint containing only a relatively small amount of basic zinc salicylate have been found to have very superior weathering properties compared to conventional paints.

A general method of preparing zinc salicylate compositions, as above defined, is first to prepare a suspension of zinc oxide in water, then while agitating in a suitable vessel, gradually to add the desired amount of salicylic acid. For commercial practice of the invention, it is preferable to mix the components in their desired proportions with water and to agitate the mixture by a suitable mechanical means, e. g. a ball mill or other conventional device, allowing several hours for the reaction to take place, and then drying without separating the aqueous medium from the solid reaction product.

The amount of water used in the preferred practice of this invention should not be more than is necessary to make a slurry which can be thoroughly mixed during the reaction period. The advantage of low water concentration is that less moisture has to be evaporated from the slurry after reaction. The drying temperature should not be so high that water of crystallization is driven off. A convenient drying temperature has been found to be in the range of 40° C. to 80° C. and preferably about 60° C.

Elevated reaction temperatures are not necessary and are occasionally undesirable since under such conditions a thick, pasty mass is obtained, during reaction, which is difficult to agitate. While somewhat faster reaction is obtained at higher temperatures, the use of a ball mill or other vigorous mixing device will insure adequate reaction speed at normal room temperatures.

When the basic zinc salicylate composition is made according to these directions, it will be found that the soluble salts of zinc and salicylic acid in the water will combine on evaporating the water to form a dry product containing 3 molecules of water of crystallization, having the formula $Zn_2C_{14}H_{10}O_7 \cdot 3H_2O$. Thus a combination of substantially 100 per cent of the raw materials is obtained.

For the purpose of being more clearly understood the preparation of the monobasic zinc salicylate is illustrated by the following example:

*Example*

A mixture consisting of 130.4 grams of zinc oxide, 220.8 grams of powdered salicylic acid and 2000 ml. of water was placed in a one gallon porcelain lined ball mill with 3 pounds of flint pebbles. The mill was sealed and rotated for about 16 hours at room temperature. The reaction mass, a suspension of fine acicular crystals was transferred, without filtration, to a tray and dried at 60° C. On analysis the product was found to contain 34.6 per cent zinc oxide, 54.0 per cent salicylic anhydride and 11.4 per cent water of crystallization, corresponding to the formula $Zn_2C_{14}H_{10}O_7 \cdot 3H_2O$.

As proof that monobasic zinc salicylate is a distinct chemical compound, it was observed that if an aqueous suspension of zinc oxide is gradually treated with salicylic acid, the liquid phase soon becomes saturated with a solute containing 1.1 moles of zinc oxide in combination with 1 mole of salicylic anhydride. When the system contains 20 moles of zinc oxide per mole of salicylic anhydride for instance, the liquid phase at 25° C. contains 1.72 grams of zinc oxide and 4.95 grams of salicylic anhydride per liter and has a pH value of about 6.5. Continued addition of salicylic acid to the suspension produces no appreciable change in pH value or composition of the liquid phase until the system contains 1.75 moles of zinc oxide and 1 mole of salicylic anhydride. At this point the pH value of the liquid phase decreases abruptly. At pH 6.08 when the system contains 1.50 moles of ZnO to 1 mole of salicylic anhydride, the concentration of the liquid phase increases to contain 2.88 grams of zinc oxide and 8.82 grams of salicylic anhydride per liter. The solid phase at this point consists solely of monobasic zinc salicylate trihydrate, $Zn_2C_{14}H_{10}O_7 \cdot 3H_2O$.

On further addition of salicylic acid to the suspension of monobasic zinc salicylate, normal zinc salicylate may be obtained. Careful tests have shown that the only two chemical compounds formed in this system are the normal and the monobasic salicylate.

By using the required amounts of zinc oxide and salicylic acid relative to their molecular weights, it is possible to prepare mixtures containing the monobasic salt and zinc oxide, or mixtures containing the monobasic salt and normal zinc salicylate. For example, if more than 2 moles of zinc oxide are provided for each 2 moles of salicylic acid, the product will be a mixture of zinc oxide and monobasic zinc salicylate; if between 1 and 2 moles of zinc oxide are used for each 2 moles of salicylic acid, the product will be a mixture of monobasic and normal zinc salicylate.

The specific gravity of monobasic zinc salicylate trihydrate is 1.87. The crystals as produced according to this invention are anisotropic in optical character. Two of the refractive indices are 1.604 and 1.675. The chemical constitution of the product, monobasic zinc salicylate trihydrate may be represented by the formula $Zn_2C_{14}H_{10}O_7 \cdot 3H_2O$. This compound, produced according to the present invention, will be found to be in the form of fine acicular crystals, a structure which is desirable for use as a pigment. Its color is white.

Basic zinc salicylate, produced according to this invention, possesses special virtues in imparting weather resistance and gloss retention to surface coating compositions of which it is all or part of the pigment phase. Even if only a small part of the pigment in such compositions is basic zinc salicylate, remarkably improved results are obtained.

To illustrate a method of preparing paints containing basic zinc salicylate and to also illustrate the remarkable effect of the presence of basic zinc salicylate on the durability of the paint, the following example is given:

*Example*

A paint containing white lead and basic zinc salicylate and one containing white lead alone as the pigment phase were formulated as follows:

|  | White Lead Paint | White Lead-Basic Zinc Salicylate Paint |
|---|---|---|
| Pigment, Per Cent | 71.1 | 66.0 |
| Vehicle, Per Cent | 28.9 | 34.0 |
| Pigment Portion: |  |  |
| White Lead, Per Cent | 100.0 | 89.4 |
| Basic Zinc Salicylate, Per Cent |  | 10.6 |
| Vehicle Portion: |  |  |
| Linseed Oil, Per Cent | 87.0 | 87.0 |
| Mineral Spirits, Per Cent | 10.0 | 10.0 |
| Drier, Per Cent | 3.0 | 3.0 |

The paints were applied to similar wooden boards and tested by actual exposure to the weather. The paints were rated for gloss, chalking and fading at intervals as shown in the table below. The ratings are based on a scale of ten to zero, where ten represents high gloss, or no chalking or fading, and zero represents no gloss or severe chalking or fading.

|  | White Lead Paint | White Lead-Basic Zinc Salicylate Paint |
|---|---|---|
| Gloss: |  |  |
| After 0 weeks exposure | 6 | 7 |
| After 8 weeks exposure | 1 | 6 |
| After 41 weeks exposure | 0 | 4 |
| Chalking: |  |  |
| After 0 weeks exposure | 10 | 10 |
| After 41 weeks exposure | 9 | 10 |
| After 67 weeks exposure | 6 | 9 |
| Fading:[1] |  |  |
| After 0 weeks exposure | 10 | 10 |
| After 41 weeks exposure | 7 | 8 |
| After 67 weeks exposure | 6 | 8 |

[1] Paints tested for fading were tinted gray with lamp black.

It is evident from the ratings shown above that the paint composition containing basic zinc salicylate has shown definitely superior weathering properties.

It will be understood by those skilled in the art that while the specific example cited showed a method utilizing the ball mill, that the product described may readily be prepared by other methods of milling or agitation. It will be further apparent many different embodiments of this invention are possible without departing from the spirit thereof, and it is to be understood that the example cited was given merely for purposes of illustration.

I claim:

1. A basic zinc salicylate composition having a content of more than 1 and up to 2 moles of zinc oxide in combination with 1 mole of salicylic anhydride and containing monobasic zinc salicylate according to the formula $$Zn_2C_{14}H_{10}O_7 \cdot 3H_2O$$

2. As a new composition of matter the compound monobasic zinc salicylate trihydrate corresponding to the formula $Zn_2C_{14}H_{10}O_7 \cdot 3H_2O$.

3. A method of producing monobasic zinc salicylate which comprises agitating a mixture of zinc oxide, salicylic acid and water, the zinc oxide and salicylic acid being in such proportion that 2 moles of zinc oxide are present for each 2 moles of salicylic acid, and drying the product without separating the liquid phase at a temperature of from 40° C. to 80° C.

4. A method of producing basic zinc salicylate composition which comprises agitating a mixture of zinc oxide, salicylic acid and water, the zinc oxide and salicylic acid being in such proportion that more than 1 and up to 2 moles of zinc oxide are present for each 2 moles of salicylic acid, and drying the product without separating the liquid phase at a temperature of from 40° C. to 80° C.

5. A method of producing basic zinc salicylate which comprises agitating the mixture of zinc oxide, salicylic acid and water, the zinc oxide and salicylic acid being in such proportion that two mols of zinc oxide are present for each two mols of salicylic acid and drying the product without separating the liquid phase at a temperature of from about 40° C. to about 80° C.

LEONARD M. KEBRICH.

REFERENCES CITED

The following references are of record in the file of this patent:

UNITED STATES PATENTS

| Number | Name | Date |
|---|---|---|
| 1,217,862 | Gerngross et al. | Feb. 27, 1917 |
| 1,933,520 | Bruson | Oct. 31, 1933 |
| 1,939,621 | Bruson | Dec. 12, 1933 |
| 2,034,889 | Williams | Mar. 24, 1936 |
| 2,157,767 | Long | May 9, 1939 |
| 2,213,168 | Monk | Aug. 27, 1940 |
| 2,377,267 | Reiff | May 29, 1945 |

OTHER REFERENCES

Beilstein: "Handbuch der Organischen Chemie," 4th ed., vol 10 (1927), page 60.

Gerhardt: "Traité de Chimie Organique," vol. 3 (1854), pp. 320–324.

Vigier: "Jour. Pharmacie et Chimie," 4th series, vol. 27 (1878), pages 41–43.

"Jahresbericht Fortschritte der Chemie," vol. 31 (1878), p. 759.

Piria: Ann. der Chemie und Pharm., vol. 93 (1855), pp. 262–4.